(12) United States Patent
Auguet

(10) Patent No.: US 7,912,606 B2
(45) Date of Patent: Mar. 22, 2011

(54) VEHICLE STEERING SYSTEM COMPRISING A DEGRADED OPERATING MODE IN CASE OF BREAKDOWN OF A WHEEL STEERING ACTUATOR

(75) Inventor: Thierry Auguet, Chapelle-Glane (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 539 days.

(21) Appl. No.: 11/988,357

(22) PCT Filed: Jun. 30, 2006

(86) PCT No.: PCT/EP2006/064758
§ 371 (c)(1),
(2), (4) Date: Jan. 4, 2008

(87) PCT Pub. No.: WO2007/003661
PCT Pub. Date: Jan. 11, 2007

(65) Prior Publication Data
US 2009/0210113 A1    Aug. 20, 2009

(30) Foreign Application Priority Data
Jul. 4, 2005    (FR) .................................... 05 07178

(51) Int. Cl.
*B62D 6/00*    (2006.01)
(52) U.S. Cl. .................. 701/41; 701/1; 701/36; 701/42; 180/408; 180/411; 180/413
(58) Field of Classification Search ............... 701/1, 36, 701/41, 42; 180/408, 411, 413
See application file for complete search history.

(56) References Cited

U.S. PATENT DOCUMENTS 5,014,802 A * 5/1991 Knoll et al. .................. 180/408
5,160,003 A * 11/1992 Suzuki ........................ 192/3.31
(Continued)

FOREIGN PATENT DOCUMENTS
EP    1316490    6/2003

*Primary Examiner* — Khoi Tran
*Assistant Examiner* — Jonathan L Sample
(74) *Attorney, Agent, or Firm* — Cohen Pontani Lieberman & Pavane LLP

(57) ABSTRACT

Steering control system for a land vehicle with at least four steered wheels (1AvG, 1AvD, 1ArG, 1ArD), the system comprising one actuator per steered wheel (3AvG, 3AvD, 3ArG, 3ArD). The system comprises a control member (2) available to a driver and delivering a demanded steering angle ($\theta$), a steering control unit (4) which, by way of input variable, uses at least the said demanded steering angel ($\theta$) to determine a steering control angle for operating the said actuator, and means (5) for detecting a lock-up of one of the steered-wheel actuators, which are capable of delivering an alarm signal identifying an actuator that has locked up. The steering control unit has at least one normal mode and at least one degraded mode in the event of an actuator becoming locked up, the degraded mode calculating the steering control angle ($\alpha p_i$) of the non-locked wheels by imposing a first degraded-mode strategy whereby the instantaneous center of rotation (CIR) of the vehicle lies more or less on the straight line perpendicular to the plane of the locked wheel and passing through the center of the ground-contact area of the locked wheel, in a position that is dependent on the demanded steering angle ($\theta$).

7 Claims, 5 Drawing Sheets

U.S. PATENT DOCUMENTS

| | | | |
|---|---|---|---|
| 5,402,344 A * | 3/1995 | Reister et al. | 701/84 |
| 6,169,951 B1 * | 1/2001 | Ghoneim et al. | 701/70 |
| 6,546,323 B2 * | 4/2003 | Deguchi et al. | 701/41 |
| 6,929,086 B1 * | 8/2005 | Husain et al. | 180/413 |
| 7,191,865 B2 * | 3/2007 | Spark | 180/411 |
| 2002/0035425 A1 * | 3/2002 | Deguchi et al. | 701/41 |
| 2003/0120405 A1 * | 6/2003 | Laurent | 701/41 |
| 2004/0140147 A1 * | 7/2004 | Laurent | 180/402 |
| 2005/0049761 A1 * | 3/2005 | Kataoka et al. | 701/1 |
| 2006/0015231 A1 * | 1/2006 | Yoshimura et al. | 701/48 |

* cited by examiner

VEHICLE STEERING SYSTEM COMPRISING A DEGRADED OPERATING MODE IN CASE OF BREAKDOWN OF A WHEEL STEERING ACTUATOR

RELATED APPLICATION

This is a U.S. National Stage of International Application No. PCT/EP2006/064758 filed on Jun. 30, 2006.

This patent application claims the priority of French patent application no. 05/07178 filed Jul. 4, 2005, the disclosure content of which is hereby incorporated by reference.

FIELD OF THE INVENTION

The present invention relates to road-going motor vehicles provided with a steering system in which each of the steered wheels is turned by its own steering actuator. The invention is aimed in particular, among known steering systems, at those which have no mechanical connection between the steered wheels and the steering wheel and also have no mechanical connection to synchronise the turning of the steered wheels themselves relative to one another.

BACKGROUND OF THE INVENTION

Steer-by-wire steering systems comprising an individual electric actuator per steered wheel are known, the steering system being capable of turning each of the steered wheels selectively by an angle specific to it, the consistency of the steering angles of each of the steered wheels being ensured by the control electronics. The electric actuator for each wheel has the purpose of imparting the steering angle chosen by the control electronics to the wheel in question. The steering control available to the driver of the vehicle may be a conventional steering wheel or a lever of the joystick type or any other suitable device. The commands imparted by the driver of the vehicle on his control device are sent to the control electronics which are loaded with suitable programs so that they can control the actuator or actuators appropriately.

One of the advantages of this technology is that it is an ideal alliance of electronics and computing, progress in which areas is allowing increasingly sophisticated control systems, which means that it is possible to place the steering of the wheels not only under the control of the manual control but also under the control of a safety system. Thus, for example, the steered wheels can be set at an angle which not only takes account of the commands input by the driver of the vehicle but which also takes account of dynamic parameters observed on the vehicle.

Thanks to the steer-by-wire technology, a far wider range of possibilities becomes available for influencing the course stability of a vehicle. For example, whereas hitherto an automatic vehicle course-correction system has imparted corrective yaw moments through the brakes of one or more wheels, the switch to electrical control of the various functions in a vehicle would allow the steering angle of the various steered wheels of the vehicle to be used to correct the course of this vehicle.

However, the steering system of a vehicle is a function that is essential and vital to safety, as are the brakes. Hence, in order to be able to take the place of power-assisted or unassisted mechanical steering systems which are almost universally adopted at the present time on all road-going vehicles, it is essential that a steer-by-wire system be extremely reliable. This is why redundant electrical systems are generally designed as these allow the system to operate even if one of its components fails. This is the idea behind the breakdown-tolerant system. All the functionalities are performed if one of the components of the system, or at least one of the components deemed to be the most important of the system, fails. Thus, for example, the electrical parts of the wheel actuators are preferably redundant. Patent application US 2003/0098197 which provides an example of a redundant system for controlling steer-by-wire system may, for example, be consulted on this subject.

Patent U.S. Pat. No. 5,014,802 describes a steering system for a 4-wheel steering vehicle which proposes that, when a first steered wheel reaches the end of its steering travel and the driver wishes to increase the steering angle still further, the Ackerman steering be followed so as to prevent the wheels from skidding along the ground under all steering circumstances. Even though the inventors have anticipated applying the invention to a system in which all the wheels are controlled individually, the possibility of a failure and the strategies to be adopted in such are not part of this description.

Now, the failure of an essential component can never be completely excluded. For example, an electric wheel actuator may fail in such a way that it adopts some arbitrary angular position, in which situation it is no longer able to transmit steering forces (or forces for holding a straight line). Alternatively, it may remain locked in a certain angular position, for example in a straight line, as a result of a mechanical problem. It is the event of an actuator locking up that this patent application addresses.

Among the known solutions, patent application US 2004/0140147 proposes to control the other wheel actuator on the same axle to a modified reference angular position so that, on the whole, the axle develops a transverse thrust that differs as little as possible from the thrust that would have been obtained without the actuator failure. This solution has the disadvantage of introducing opposing stresses, particularly in the tyres. It is therefore desirable to adopt this approach only as a last resort. There is still a need to find solutions to deal with an electric actuator locking up without developing such opposing forces.

SUMMARY OF THE INVENTION

It is one object of the invention to, should it prove impossible to change the steering angle of one of the steered wheels, be able to maintain control of the course of the vehicle as far as possible in accordance with the wishes of its driver, preferably without causing the wheels to skid, at least so that the vehicle can be brought to rest somewhere that is safe for its passengers.

It is another object of the invention to, when it proves impossible to prevent the wheels from skidding, be able, in spite of everything, to adopt a strategy for controlling the steering of the wheels that are not locked which is as appropriate as possible to the situation in order at least that the vehicle can be brought to rest somewhere that is safe for its passengers.

BRIEF DESCRIPTION OF THE INVENTION

One aspect of the invention is directed to a steering control system for a land vehicle with at least four steered wheels. The system comprises one actuator per steered wheel, an actual steering angle sensor for each of the steered wheels, and a control member available to a driver and delivering a demanded steering angle. The steering system comprises a steering control unit which, by way of input variable, uses at least the said demanded steering angle to determine a steering control angle for operating the actuator. The system comprises means for detecting a lock-up of one of the steered-wheel actuators, the means being capable, should a lock-up be detected, of delivering an alarm signal identifying which actuator has locked up. The steering control unit has at least one normal mode and at least one degraded mode in the event of an actuator becoming locked up, the degraded mode calculating the steering control angle of the non-locked wheels by imposing a first degraded-mode strategy whereby the instantaneous center of rotation of the vehicle lies more or less on the straight line perpendicular to the plane of the locked wheel and passing through the center of the ground-contact area of the locked wheel, in a position that is dependent on the demanded steering angle.

The operation proposed hereinabove can be qualified as a "degraded mode". Not all of the functionalities are still performed, but the operating safety of the vehicle remains assured as far as possible according to the circumstances. The degraded mode will allow the vehicle steering system to operate in a way which, while admittedly less pleasant, does avoid any tragic consequences for the passengers of the vehicle.

Of course, steer-by-wire systems, which in other respects meet the characteristics mentioned in the above preamble, offer a favorite field of application for the invention. However, this is nonlimiting, it also being possible for hydraulic steering systems to be constructed as proposed by the invention.

The higher the speed at which a vehicle is travelling, the more important the dynamic equilibrium of the vehicle is to safety. It should be noted that, when travelling at sustained speed, the wheel steering angles are always fairly small. Should a wheel lock up in a slightly turned position, when return to a straight line is commanded by a zero angle input through the steering wheel, the principle proposed by the invention will mean that the vehicle will crab in degraded mode, that is to say will travel with a non-zero angle between the longitudinal axis of the vehicle and the direction of travel of the vehicle. This is entirely acceptable because the said angle is quite small. This angle could become large if an actuator failed at low speed, and this would then result in an angle characteristic of more serious crabbing, which would perhaps not be very pleasant but would not be at all dangerous given the low speed at which this type of degraded mode would occur.

As a preference, the steering control system according to the invention comprises at least one second degraded-mode control strategy based on positioning the CIR as a function of the $1^{st}$ non-locked wheel that mechanically reaches the end of its travel.

Of course, what is proposed above offers no more than a degraded mode of operation to be called upon only after other things have been tried when the steering system, in spite of there being redundant elements in the said steering system, becomes incapable of imposing on one of the steered wheels steering angles that correspond either to the wishes of the driver or to the requirements as calculated by a vehicle course-control electronic management system. These degraded modes may be supplemented by other strategies which may or may not act on the steering angle of some of the wheels.

DETAILED DESCRIPTION OF THE DRAWINGS

Before continuing, let us define the following notation:
when a reference is accompanied by a suffix "Av", that means that the object denoted by the reference relates to the front of the vehicle, and when a reference is accompanied by a suffix "Ar", that means that the object denoted by the reference relates to the rear of the vehicle;
when a reference is accompanied by a suffix "D", that means that the object denoted by the reference relates to the right-hand side of the vehicle, and when a reference is accompanied by a suffix "G", that means that the object denoted by the reference relates to the left-hand side of the vehicle;
when a reference is accompanied by a suffix "B", that means that the object denoted by the reference has an actuator locked up, and when a reference is accompanied by a suffix "NB", that means that the object denoted by the reference has an actuator that is not locked up.

Figure 1:
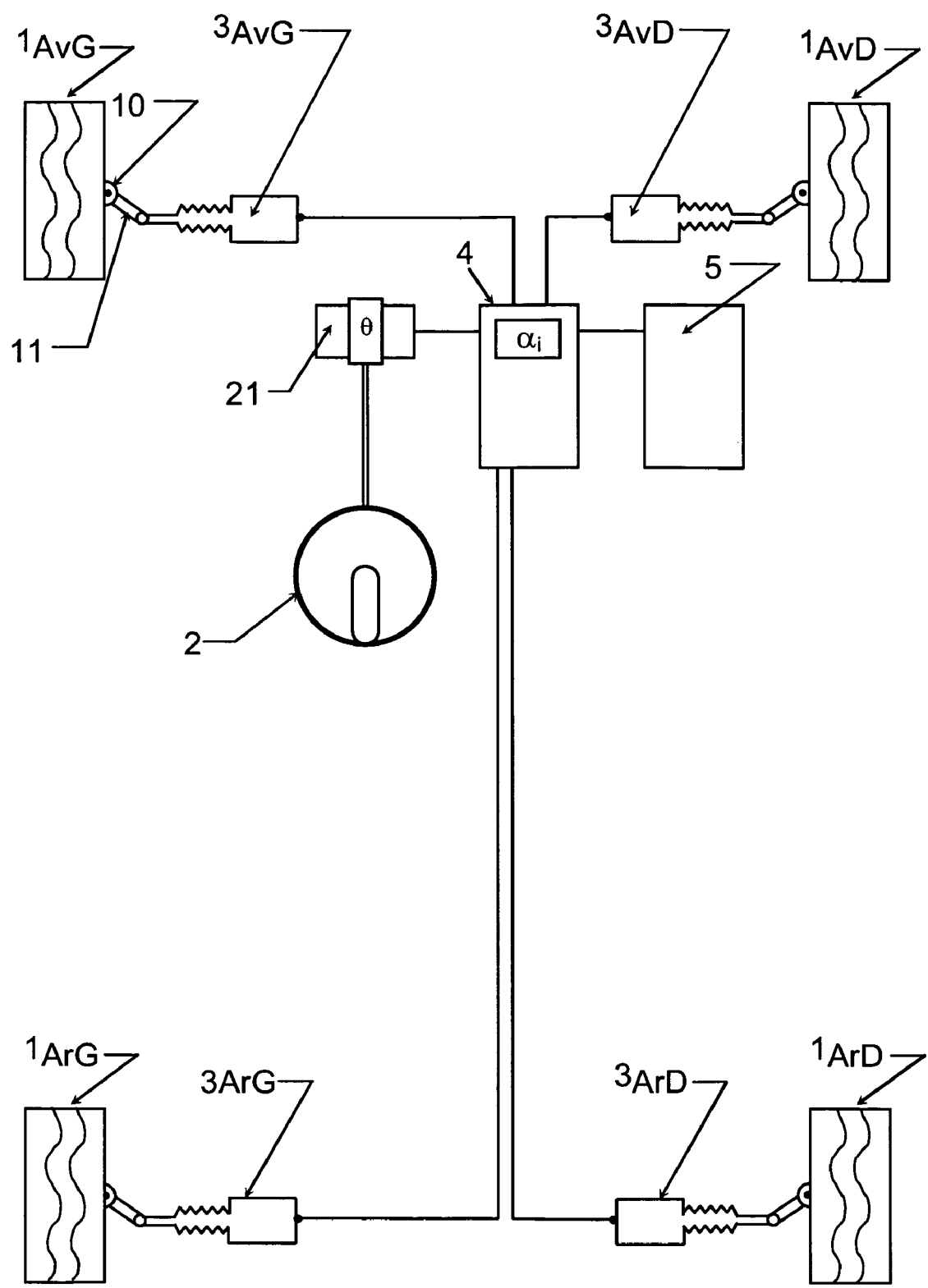
FIG. 1 is an installation diagram of a steer-by-wire system according to the invention.

FIG. 1 schematically depicts a vehicle with four wheels 1, all steered. The steered wheels are mounted on a steering knuckle (not visible) and are turned about a steering pivot 10. A steering arm 11 is securely fastened to the steering knuckle. Each steered wheel is steered by an electric actuator 3 connected, on the one hand, to the body or the chassis of the vehicle and, on the other hand, to the arm 11, to control the steering angle of the wheel in question. Each electric actuator 3 comprises, for example, a screw/nut device (not depicted), actuated by a rotary electric motor. The screw of the screw-nut device is connected to the steering arm 11. Each actuator preferably comprises a position sensor in order, as required through geometric construction and associated calculation, to determine, from the measurement delivered by the position sensor, the precise angular position of the steered wheel in question. By way of example, use may be made of the electric actuators described in patent U.S. Pat. No. 6,820,715.

There is also a steering wheel 2 mechanically connected to a device 21 for measuring the angle "θ" at the steering wheel. "θ" denotes any particular value (in terms of amplitude and in terms of sign) characterizing the command that the driver inputs into a control member in order to influence the steering of the vehicle; for example, this is a steering wheel turned through a predetermined angular range (the idea of an angle is nonlimiting insofar as any equivalent device such as a joystick or a slider may take the place of the steering wheel).

The system comprises means 5 for detecting that one of the steered wheel actuators has locked up, these means being capable, should they detect a lock-up, of delivering an alarm signal identifying the actuator that has locked up. To detect the lock-up, it is for example possible to measure the current drawn by the actuator and compare it against changes in the position of the said actuator. If the current remains at a high level or even increases while the position of the actuator no longer varies, this indicates that the actuator has locked up. It is then possible to disable this actuator electrically, and switch to degraded mode.

Figure 2:
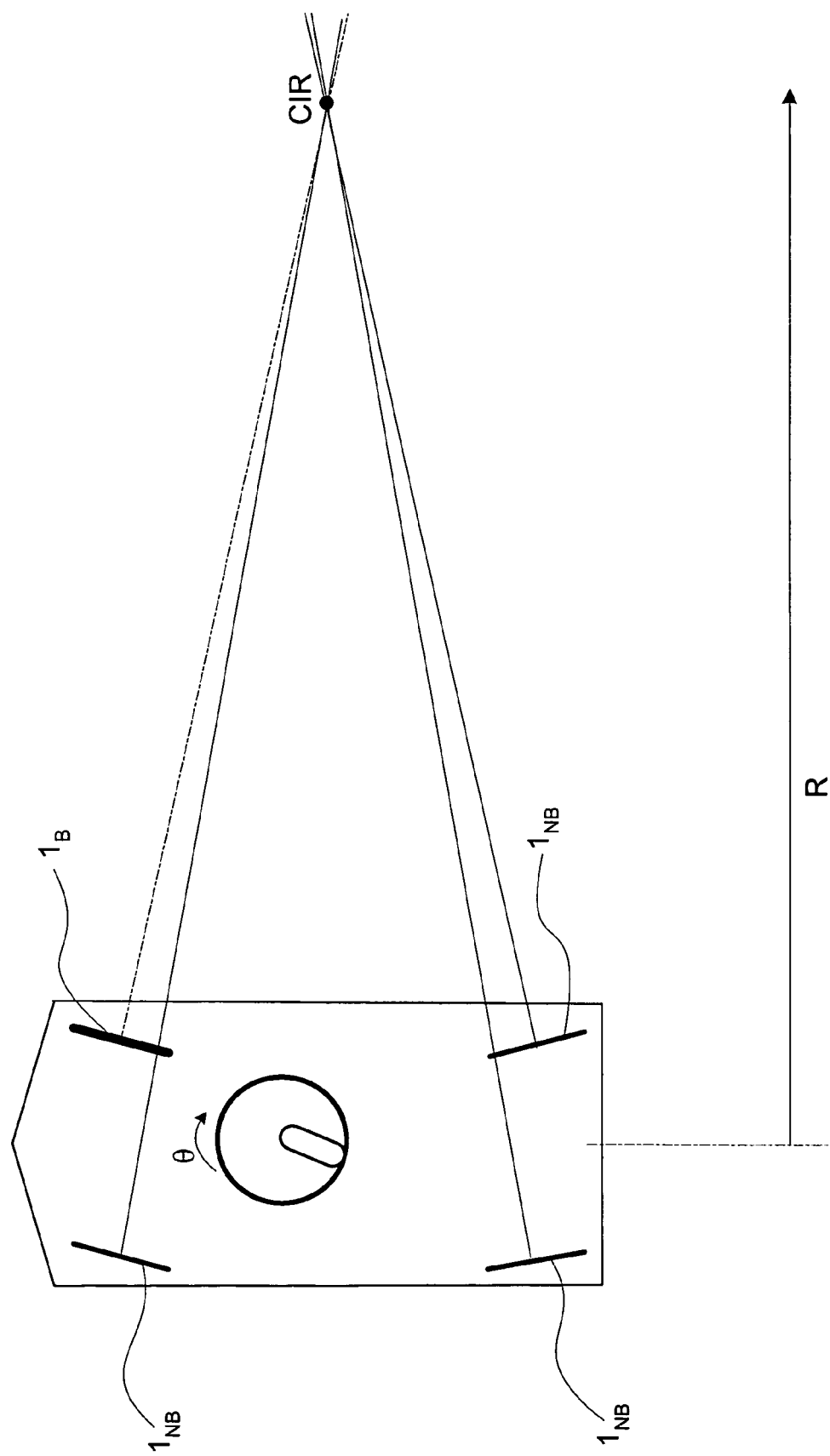
FIG. 2 shows a four-wheel steering vehicle in a configuration for steering to the right as the right front wheel actuator locks up.
Figure 3:
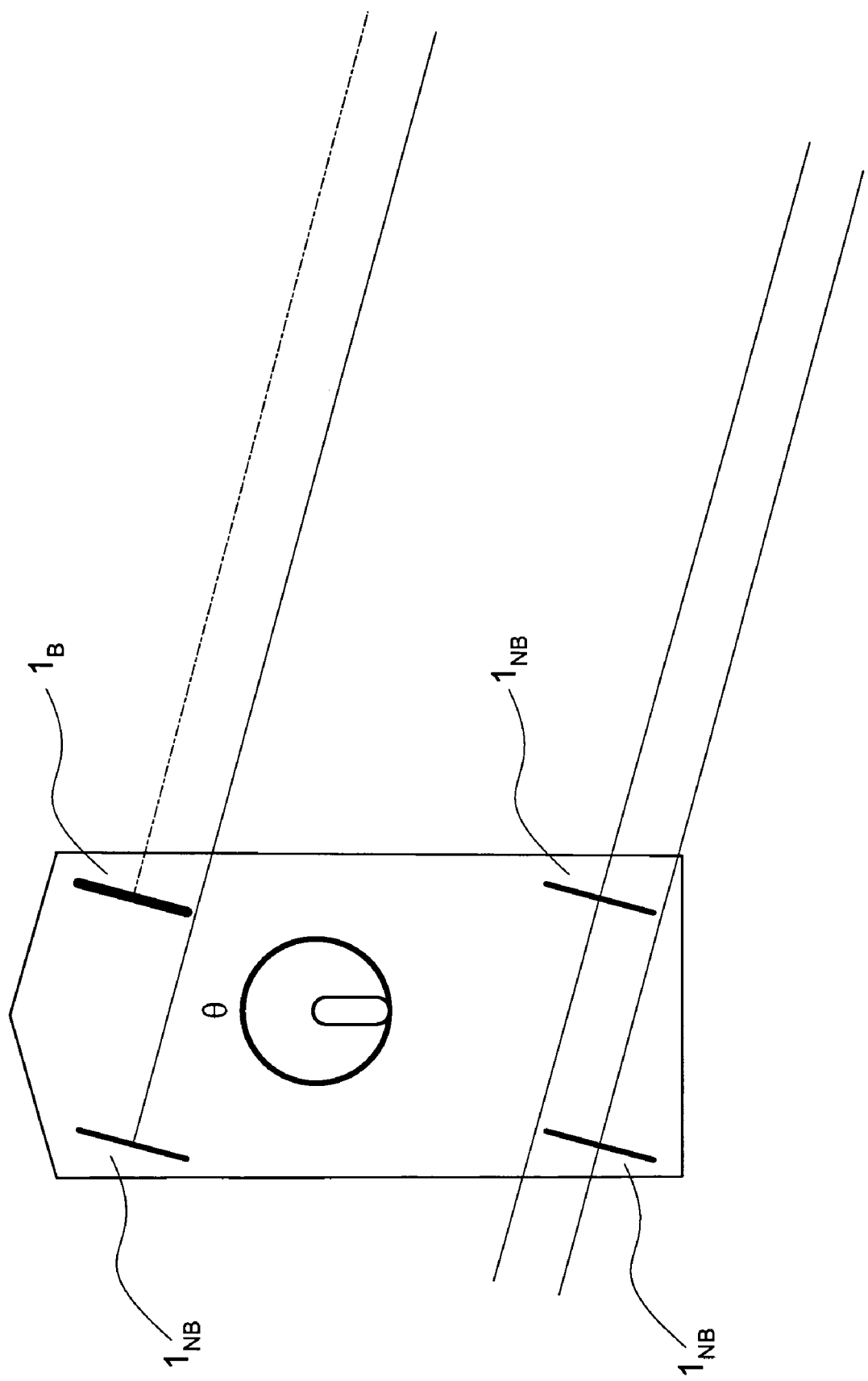
FIG. 3 shows the situation of this vehicle operating in degraded mode allowing the vehicle to drive in a straight line.
Figure 4:
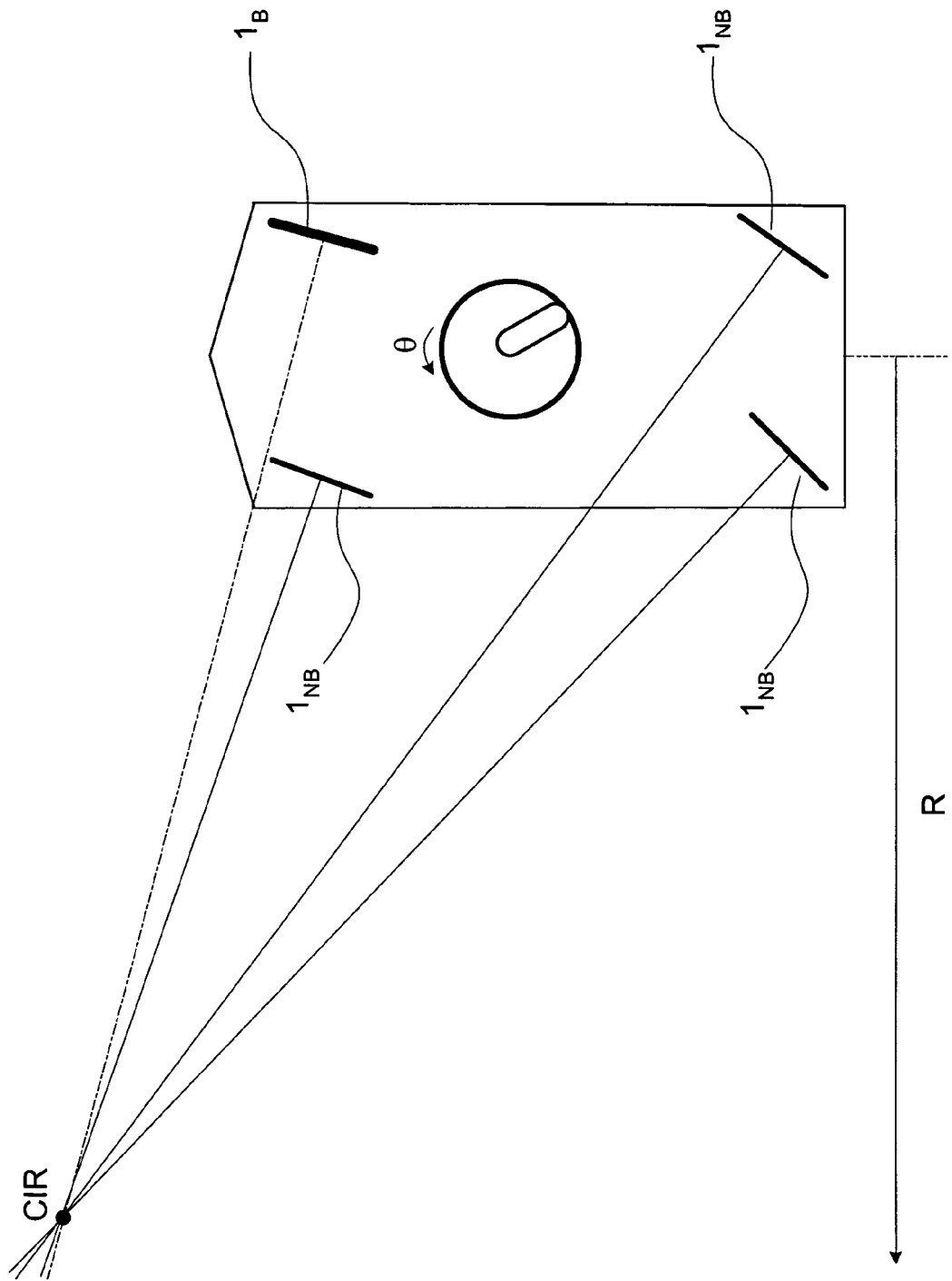
FIG. 4 shows the situation of this vehicle operating in degraded mode allowing the vehicle to steer to the left; and, FIG. 5 schematically illustrates the degraded-mode strategies for a four-wheel steering vehicle, in a configuration for steering to the right while the right front wheel actuator locks up.

FIGS. 2 to 4 give an illustration of the first strategy for calculating the control angles for the actuators which are not locked up in the degraded mode proposed by the present invention. These figures show the situation in which a right front actuator locks up during a turn to the right. The degraded mode calculates the steering control angle $\alpha p_i$ for the non-locked wheels $1_{NB}$, that is to say the angles $\alpha p_{AvG}$, $\alpha p_{ArD}$, $\alpha p_{ArG}$. To prevent the wheels from skidding, the instantaneous center of rotation CIR of the vehicle needs to be kept more or less along the straight line perpendicular to the plane of the right front wheel $1_{AvD}$, namely the locked wheel, and passing through the center of the ground-contact area of the said right front wheel $1_{AvD}$. The precise position of the CIR along the said perpendicular straight line is dependent on the demanded steering angle θ, which corresponds to the turning circle radius R desired by the driver. Let us note that calculating this turning circle radius does not form part of the present invention, which is compatible with numerous ways of determining the radius R.

If, starting out from the situation illustrated in FIG. 2, the driver decreases the demanded steering angle θ, that is to say wishes to increase the radius R of the turning circle, the CIR will shift to the right on the straight line depicted in chain line, that is to say will move away from the vehicle. If the driver wishes to bring the vehicle back into a straight line, then the configuration illustrated in FIG. 3 is obtained. The radius R then tends towards infinity, the control angle for the wheel actuators that are not locked $1_{NB}$ is identical for all the wheels and takes the value of the angle of the actuator of the locked up wheel $1_{AvD}$. The CIR is pushed back to infinity, allowing the vehicle to drive in a straight line. The vehicle, operating in degraded mode, drives in a straight line in a "crab-like" fashion.

FIG. 4 shows the situation of this vehicle operating in degraded mode from the lock up illustrated in FIG. 2, if the driver now wishes to steer his vehicle to the left. With respect to the locked up wheel $1_{AvD}$, the other wheels which are not locked up $1_{NB}$ are steered in such a way as to position the CIR still on the straight line depicted in chain line, perpendicular to the locked up wheel $1_{AvD}$, and on the left-hand side relative to the vehicle.

The invention thus proposes a first degraded-mode strategy that allows all the steered wheels to be steered about the same instantaneous center of rotation CIR which is kept more or less on the straight line perpendicular to the plane of the right front wheel $1_{AvD}$, the locked up wheel. That makes it possible to follow the Ackerman steering and therefore prevent the wheels from skidding along the ground. However, depending on the initial position in which one of the steered wheels locks up, once the variation in steering angle demanded by the driver since the onset of lock up of one of the steered wheels is exceeded, it will no longer be possible to impart to the vehicle the yawing movement desired by the driver without accepting a certain degree of slippage of the wheels on the ground. This is because, in order to respond to this variation in steering angle demanded by the driver, at least one of the non-locked-up wheels of the vehicle would have to be turned through an angle beyond the mechanical limit on steering angle introduced through the design of the vehicle, something which is quite obviously impossible. It would therefore no longer be possible to keep the instantaneous center of rotation CIR more or less on the straight line perpendicular to the plane of the right front wheel $1_{AvD}$, the locked up wheel.

The invention proposes second and third degraded-mode strategies whereby, in general, that is to say in most of the situations encountered in practice, it is possible to impart a yawing movement in the direction desired by the driver. This may cause the wheels to skid on the ground to a certain extent, but this skidding is entirely acceptable during a manoeuvre normally of a fairly brief duration and which, in spite of a breakdown, allows the ability to control the course of the vehicle to be maintained.

Figure 5:
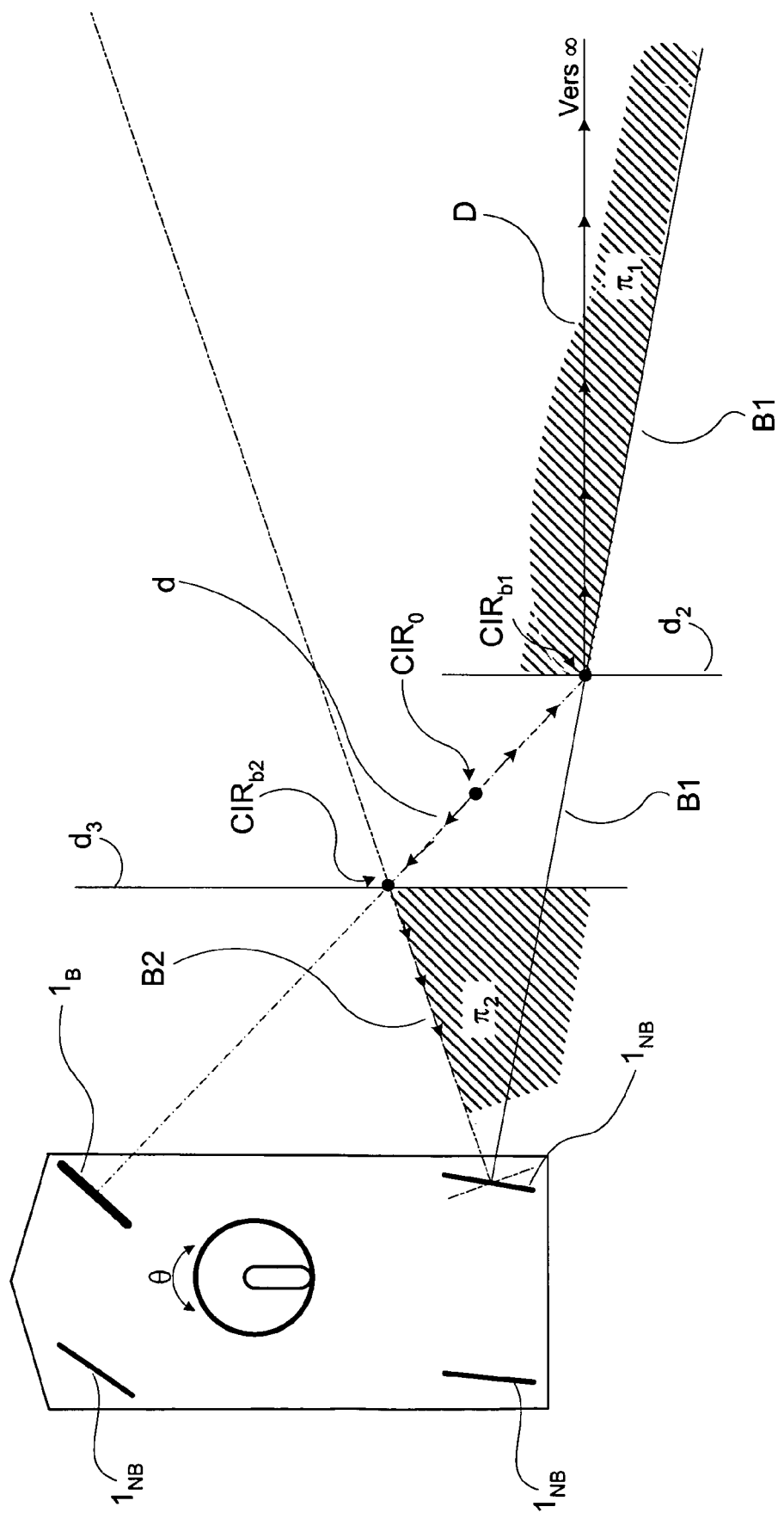

This is what is explained with reference to FIG. 5 which diagrammatically depicts the degraded-mode strategies for a four-wheel steering vehicle, in a configuration of steering to the right as the right front wheel actuator locks up.

Let us assume that, at the instant the right front actuator locks up, the vehicle was turning about the instantaneous center of rotation $CIR_0$. Let us then assume that the driver wishes to exit the turn, that is to say wishes gradually to increase the radius R of the turning circle. Applying the first degraded-mode strategy causes the CIR to travel along the straight line "d" in a direction which tends to move it away from the vehicle as far as the position $CIR_{b1}$ which is the instantaneous center of rotation ($CIR_{b1}$) that is live at the instant the wheel reaches the end of its steering travel. At this stage, given the configuration of the vehicle, let us assume that it is the right rear actuator which reaches the end of its steering travel. The lengthening of the radius of the turning circle would require a further increase in rightward steering angle of the right rear wheel, and this is impossible.

In this case, when, in addition, the controlled steering angle reaches the end of its travel in respect of one of the actuators that is not locked up, and the change in the said demanded steering angle θ corresponds to an increase in the turning circle of the vehicle, the said steering control unit imposes a second degraded-mode strategy whereby the locus of the instantaneous center of rotation CIR of the vehicle is bounded by the straight line B1 perpendicular to the plane of the wheel that has reached the end of its travel passing through the center of the ground-contact area of that said wheel, in this case the right rear wheel, and lies in the half-plane π1 towards the front of the vehicle with respect to the said boundary B1, and on the side towards infinity with respect to a straight line d2 parallel to the longitudinal axis of the vehicle and passing through the instantaneous center of rotation $CIR_{b1}$ that is live at the instant that wheel reached the end of its steering travel.

Advantageously, the instantaneous center of rotation CIR for the second degraded-mode strategy lies on a straight line D parallel to the transverse direction with respect to the vehicle, passing through the instantaneous center of rotation $CIR_{b1}$ that is live at the instant that wheel reached the end of its steering travel. The CIR travels along the straight line D; the right rear wheel is no longer at the end of its steering travel. This second degraded-mode strategy allows the radius R of the turning circle to be increased gradually in order to satisfy the driver's steering demands, while at the same time limiting the skidding of the wheels on the ground as far as possible.

Let us now assume that the turn tightens. The driver would therefore like gradually to decrease the radius R of the turning circle. Applying the first degraded-mode strategy causes the CIR to travel along the straight line "d" in a direction which tends to bring it closer to the vehicle as far as the position $CIR_{b2}$ which is the instantaneous center of rotation ($CIR_{b2}$) that is live at the instant that the right rear wheel reaches the other end of its steering travel. At this stage, given the configuration of the vehicle, let us suppose that it is the right rear actuator that reaches the end of its steering travel. Reducing the radius of the turning circle would mean further increasing the leftward steering angle of the right rear wheel, and this is impossible.

In this case, when, in addition, the controlled steering angle reaches the end of its travel in respect of one of the actuators that is not locked up and the change in the said demanded steering angle θ corresponds to a reduction in the turning circle demanded by the driver, the said steering control unit imposes a third degraded-mode strategy whereby the locus of the instantaneous center of rotation CIR of the vehicle is bounded by the straight line B2 perpendicular to the plane of the wheel that has reached the end of its travel, in this instance the right rear wheel, passing through the center of the ground-contact area of that said wheel, the locus of the instantaneous center of rotation CIR lying, on the one hand, in the half-plane π2 extending towards the rear of the vehicle with respect to the said boundary and, on the other hand, on the vehicle side with respect to a straight line d3 parallel to the longitudinal axis of the vehicle and passing through the instantaneous center of rotation $CIR_{b2}$ that is live at the instant that other wheel reaches the end of its steering travel.

Advantageously, the instantaneous center of rotation CIR of the third degraded-mode strategy lies on the straight line B2 perpendicular to the plane of the wheel that has reached the end of its travel passing through the center of the ground-contact area of that said wheel.

Finally, let us point out that accidental lock-up of a wheel actuator is a phenomenon similar to the situation of an actuator that has reached the end of its travel. As a result, the invention can also be applied to situations in which, although one of the actuators has reached the end of its travel, the radius of the turning circle of the vehicle needs to be reduced further, obviously by accepting that the wheels will begin to skid. The third degraded-mode strategy can then be applied, taking the actuator that has locked up and the actuator that has reached the end of its travel to be one and the same actuator.

The invention has been illustrated by applications to a 4-wheel vehicle with 4-wheel steering. However, this is not in any way limiting. The vehicle may have any number of wheels, not necessarily all steered. For example, let us adopt the case of an 8-wheel vehicle with all-wheel steering. Control of the CIR of the vehicle in normal mode allows a steering angle to be calculated for each of the eight wheels. Let us imagine that one of the eight wheels locks up. The CIR is then positioned on the straight line perpendicular to the plane of the locked-up wheel and the steering angle of the other seven wheels is controlled in such a way that they all turn about this CIR. The $2^{nd}$ and $3^{rd}$ degraded-mode control strategies, which accept a certain degree of skidding of the wheels, are based on a positioning of the CIR that is a function of the $1^{st}$ wheel that is not locked up which reaches the mechanical end of its travel. It is of little importance whether there are three or seven of such wheels, the principle remains the same.

The invention claimed is:

1. A steering control system for a land vehicle comprising:
   at least four steered wheels;
   one actuator per steered wheel;
   an actual steering angle sensor for each of the steered wheels;
   a control member available to a driver configured to deliver a demanded steering angle,
   a steering control unit which, by way of input variable, uses at least the demanded steering angle to determine a steering control angle for operating the said actuator; and
   a lock-up detector for detecting a lock-up of one of the steered-wheel actuators, said detector being capable, should a lock-up be detected, of delivering an alarm signal identifying which actuator has locked up,
   wherein said steering control unit includes at least one normal mode and at least one degraded mode in the event of an actuator becoming locked up, the degraded mode calculating the steering control angle of the non-locked wheels by imposing a first degraded-mode strategy whereby the instantaneous center of rotation (CIR) of the vehicle lies more or less on the straight line perpendicular to the plane of the locked wheel and passing through the center of the ground-contact area of the locked wheel, in a position that is dependent on the demanded steering angle.

2. The steering system according to claim 1, wherein, when the controlled steering angle reaches the end of its travel in respect of one of the actuators that has not locked up, the steering control system comprises at least one second degraded-mode control strategy based on positioning the CIR as a function of the $1^{st}$ non-locked wheel that mechanically reaches the end of its travel.

3. The steering system according to claim 2 wherein, when the controlled steering angle reaches the end of its travel in respect of one of the actuators that is not locked up, and the change in the said demanded steering angle corresponds to an increase in the turning circle of the vehicle, said steering control unit imposes a second degraded-mode strategy whereby the locus of the instantaneous center of rotation CIR of the vehicle is bounded by the straight line perpendicular to the plane of the wheel that has reached the end of its travel passing through the center of the ground-contact area of that said wheel, and lies in the half-plane towards the front of the vehicle with respect to the said boundary, and on the side towards infinity with respect to a straight line parallel to the longitudinal axis of the vehicle and passing through the instantaneous center of rotation that is live at the instant that wheel reached the end of its steering travel.

4. The steering system according to claim 3, wherein the instantaneous center of rotation CIR for the second degraded-mode strategy lies on a straight line parallel to the transverse direction with respect to the vehicle, passing through the instantaneous center of rotation that is live at the instant that wheel reached the end of its steering travel.

5. The steering system according to claim 2, wherein when the controlled steering angle reaches the end of its travel in respect of one of the actuators that is not locked up and the change in the demanded steering angle corresponds to a reduction in the turning circle demanded by the driver, the steering control unit imposes a third degraded-mode strategy whereby the locus of the instantaneous center of rotation CIR of the vehicle is bounded by the straight line perpendicular to the plane of the wheel that has reached the end of its travel passing through the center of the ground-contact area of that said wheel and lies in the half-plane towards the rear of the vehicle with respect to the said boundary, and on the vehicle side with respect to a straight line parallel to the longitudinal axis of the vehicle and passing through the instantaneous center of rotation that is live at the instant that other wheel reaches the end of its steering travel.

6. The steering system according to claim 5, wherein the instantaneous center of rotation CIR of the third degraded-mode strategy lies on the straight line perpendicular to the plane of the wheel that has reached the end of its travel passing through the center of the ground-contact area of that said wheel.

7. The steering system according to claim 1, wherein the wheel actuators are electric actuators.

* * * * *